United States Patent [19]

Lee et al.

[11] Patent Number: 5,751,290
[45] Date of Patent: May 12, 1998

[54] THREE DIMENSIONAL GRAPHICS SYSTEM AND METHOD WITH CORRECTION TO Z BUFFER VALUE ERRORS

[75] Inventors: Ruen-Rone Lee, Hsinchu; Chun-Kai Huang, Taichung, both of Taiwan

[73] Assignee: Industrial Technology Research Institute, Hsinchu, Taiwan

[21] Appl. No.: 710,652

[22] Filed: Sep. 20, 1996

[51] Int. Cl.$^6$ ................................................. G06T 15/40
[52] U.S. Cl. .............................................. 345/421; 345/422
[58] Field of Search ........................... 395/119, 120, 395/121, 122, 123, 124, 133

[56] References Cited

U.S. PATENT DOCUMENTS

| | | | |
|---|---|---|---|
| 5,220,646 | 6/1993 | Fossum | 395/122 |
| 5,280,568 | 1/1994 | Obata | 395/121 |
| 5,295,234 | 3/1994 | Ishida et al. | 395/122 X |
| 5,313,566 | 5/1994 | Hedley et al. | 395/121 X |
| 5,542,032 | 7/1996 | Pritt | 395/121 |
| 5,561,750 | 10/1996 | Lentz | 395/122 |

*Primary Examiner*—Heather R. Herndon
*Assistant Examiner*—Cliff N. Vo
*Attorney, Agent, or Firm*—Meltzer, Lippe, Goldstein, Wolf & Schlissel, P.C.

[57] ABSTRACT

A method and system are provided for drawing one or more surfaces. The system includes a drawing processor, a frame buffer with z buffer and a display device, such as a display monitor. The drawing processor can perform all of the following steps. A first pixel in a first row is selected. The first pixel is near a first point at which a projection onto a plane of view of a first edge of a first surface intersects the first row of pixels in the plane of view. A first distance from the first point to a second point on the first surface is determined. The first point is a projection onto the plane of view of the second point. The first distance is then corrected by a first value representing a difference in distance between the first distance and a distance from the first pixel to a third point on the first surface. The first pixel overlies, e.g., and is centered at, a point that is a projection onto the plane of view of the third point. The corrected first distance is assigned to the first pixel as representing a distance from the first pixel to the first surface.

21 Claims, 9 Drawing Sheets

THREE DIMENSIONAL GRAPHICS SYSTEM AND METHOD WITH CORRECTION TO Z BUFFER VALUE ERRORS

RELATED APPLICATIONS

The subject matter of this application is related to the subject matter of the following patents and patent applications:

1. U.S. patent application Ser. No. 08/598,522, entitled, "Virtual Coordinate To Linear Physical Memory Address Converter For Computer Graphics System," filed for Erh-Chia Wang, Wei-Kuo Chia, and Chun-Yang Cheng on Feb. 8, 1996;

2. U.S. patent application Ser. No. 08/598,520, entitled, "Blending Apparatus for Computer Graphics System," filed for Jan-Han Hsiao, Wei-Kuo Chia and Chun-Kai Huang on Feb. 8, 1996;

3. U.S. patent application Ser. No. 08/598,523, entitled, "A Mip Map/Rip Map Texture Linear Addressing Memory Organization and Address Generator," filed for Ruen-Rone Lee, Chun-Kai Huang and Wei-Kuo Chia on Feb. 8, 1996;

4. U.S. patent application Ser. No. 08/598,521, entitled, "Texture Filter Apparatus for Computer Graphics System," filed for Yu-Ming Lin, Chun-Kai Huang and Wei-Kuo Chia on Feb. 8, 1996;

5. U.S. Pat. No. 5,422,657, entitled, "A Graphics Memory Architecture For Multi-mode Display System," filed for Shu-Wei Wang, Wei-Kuo Chia, Chun-Kai Huang and Chun-Chie Hsiao on Sep. 13, 1993;

6. U.S. Pat. No. 5,321,425, entitled, "Resolution Independent Screen Refresh Strategy," filed for Wei-Kuo Chia, Jiunn-Min Jue, Gen-Hong Chen and Chih-Yuan Liu on Feb. 19, 1992;

7. U.S. Pat. No. 5,268,682, entitled, "Resolution Independent Raster Display System," filed for Wen-Jann Yang, Chih-Yuan Liu and Bor-Chuan Kuo on Oct. 7, 1991; and 8. U.S. Pat. No. 5,268,681, entitled, "Memory Architecture With Graphics Generator Including A Divide By Five Divider," filed for Cheun-Song Lin, Bor-Chuan Kuo and Rong-Chung Chen on Oct. 7, 1991.

All of the above-listed patents and patent applications are commonly assigned to the assignee of this application and are incorporated herein by reference.

FIELD OF THE INVENTION

The present invention pertains to three dimensional (3D) graphics in which one or more 3D objects, such a points, lines, planes, curves, polygons, surfaces, etc., are located in a virtual 3D space. The image of each object is projected onto a two dimensional (2D) plane of view. The present invention more particularly pertains to the hidden line and surface removal technique called "z buffering," which ensures that only those portions of objects that are not occluded by other objects are projected onto the 2D plane of view.

BACKGROUND OF THE INVENTION

FIG. 1 depicts a system 10 capable of displaying 3D graphics. The system 10 includes a processor 12, e.g., a microprocessor, such as Intel's™ Pentium Pro™ or Motorolla's™ PowerPC 604™, which can execute instructions. The system 10 also has a memory, for instance, a main DRAM memory 14, a cache SRAM memory 16 and a disk memory 18, for storing information and program instruction data. The system 10 furthermore has a permanent or hard copy display device 20, such as a printer or plotter. The system 10 also has a temporary display device or display monitor 22, such as a CRT or LCD monitor. An input device 24, such as a keyboard and mouse, may also be provided for user input. Each of the devices 12, 14, 16, 18, 20, and 24 is connected to a bus 26 which enables information and program instruction data to be communicated therebetween.

The hard copy display device 20 is capable of generating a permanent image, including a 2D image in a plane of view of one or more objects in 3D space. Such a permanent image may be provided in paper form.

More importantly, however, the system 10 can generate 2D images in a plane of view of objects in 3D space for temporary display on the display monitor 22. This can be achieved in a number of ways. Advantageously, however, it is achieved as follows. Certain information and program instruction data regarding the size, shape and location of the 3D objects in a virtual 3D space is downloaded to a graphics accelerator 30 via the bus 26, for example, from the processor 12, memory 14, 16 or 18, etc. Such information and program instructions are received at a drawing processor 32 which "renders," i.e., locates the objects in virtual 3D space relative to a plane of view. Note that the locations and orientations of the objects and plane of view illustratively may be selected by the user or application program executed by the processor 12. As described in greater detail below, the drawing processor 32 illustratively "projects" the 3D objects onto the plane of view. Using the projections, the drawing processor 32 forms pixellated images, or images constructed from multiple pixels, which depict those portions of the 3D objects as seen in the plane of view. The pixellated images are illustratively stored as a "frame" in a frame buffer 34, which may include DRAMs or VRAMs. The drawing processor 32 or other screen refresh circuitry may periodically cause the frame buffer 34 to output the pixel data of frames stored therein for display on the display monitor 22.

The 3D rendering of objects in 3D space onto a plane of view is well known. See J. FOLEY, A. VAN DAM, S. FEINER & J. HUGHES, COMPUTER GRAPHICS: PRINCIPLES AND PRACTICE, p.67–199, 229–283, 471–531 (1987). For sake of convenience, only a brief review of basic concepts are provided herein. FIG. 2 depicts a fixed origin O in a virtual 3D space. A plane of view P is also located in fixed relation to the origin O. Typically, in the graphics art, the plane of view P is located in parallel to the XY plane of the origin O, and intersecting the Z axis at some point, for sake of convenience. A "projection" process is then used to determine how the objects would look when viewed in the plane of view P. Illustratively, a "center of projection" technique, with center of projection at origin O is depicted in FIG. 2, although a planar projection technique may also be used. According to the projection technique, each point on each object is "projected," i.e., cast or mapped, onto the plane of view at the point where a line L from the center of protection O through the to-be-projected point intersects the plane of view. Thus, the point p1 on object o1 is projected or mapped to the point P1 where the projection line L from O through p1 intersects the plane of view P.

Often, each object o1, o2, o3, . . . etc. is estimated as one or more interconnected polygons, such as triangles or trapezoids. Even a complex curved surface can often be adequately represented by a number of interconnected polygons through appropriate sampling. Each polygon has a number of edges connected at vertices.

In addition, the display of the image in the plane of view on the display device 20 or 22 is limited to displaying a finite number of fixed sized pixels (although the number and size of the pixels can vary from device to device). Therefore, to project an object onto the plane of view P it is usually sufficient to project each polygon onto the plane of view, wherein the image of each polygon is estimated as a pixellated image or aggregation of pixels in the approximate vicinity of the projection of the polygon onto the plane of view P. This estimation process is referred to as "scan conversion."

A scan conversion process for forming a projected pixellated image is illustrated in FIGS. 3 and 4. As shown, a triangle T, having vertices a, b and c is to be projected onto the plane of view P divided into a regularly ordered pixels. Illustratively, for sake of convenience, the pixels are said to be organized into a rectangular array of "rows" and "columns" wherein the columns are orthogonal to the rows. However, the discussion herein applies to other ordered arrangements of pixels, such as hexagonal grids. Furthermore, note that rows are commonly viewed as horizontally directed and columns as vertically directed. However, herein, the only requirement on rows and columns is that they be different linear directed orderings of the pixels. The points A, B and C represent the projections of the vertices a, b and c onto the plane of view P. The pixels that are viewable in the plane of view as described below (i.e., are not occluded by another polygon), which approximately lie within the projection of the polygon are assigned data representative of the image of the polygon T, i.e., data representative of its color, texture, shading, etc. Such assigned data is placed at an appropriate location in the frame buffer 34 for later display.

Not all portions of every polygon of the same or different object can be "seen" in the plane of view P. In particular, polygon portions closer to the plane of view can occlude all or part of polygons farther from the plane of view. Fortunately, in pixellated images, a simple technique, referred to as "Z-buffering," can be used to determine which polygon should be represented by a pixel when several polygons map to the same pixel.

FIG. 5 illustrates two intersecting triangles T1 and T2 to be projected onto the plane of view P using the Z-buffering technique. Illustratively, the frame buffer 34 is supplemented with a Z-buffer for storing additional distance information for each pixel. Note that the plane of view is parallel to the XY plane of the origin O. The approximate Z-coordinate of the portion of a polygon surface currently represented by a pixel therefore provides an adequate relative indication of the distance of the represented polygon portion from the plane of view P. Assume for sake of example that representative polygon portions with larger Z-coordinates are closer to the plane of view than representative polygon portions with smaller Z-coordinates. The mapping of the two polygons T1 and T2 onto the plane of view and the storage of pixel data therefor in the frame buffer 34 can then be achieved using the process set forth below (in pseudo code format). In the process set forth below:

| pz | is a temporary variable in which the Z-coordinate (or distance from the view plane) of a portion of the polygon representing the currently selected pixel is stored, |
|---|---|
| x | is an integer row pixel coordinate between the integers 0 and Xmax (where Xmax is an integer > 0), |
| y | is an integer column pixel coordinate between the integers 0 and Ymax (where Ymax is an integer > 0), |
| Frame-Buffer | is an array that stores pixel data (e.g., in row column format) and |
| Z-buffer | is an array that stores the Z-coordinate of the polygon portion represented by the pixel. |

```
procedure zBuffer
var
    pz:integer;
    Z-buffer [0:Xmax,0:Ymax]:real;
    Frame-Buffer [0:Xmax,0:Ymax]:pixel-data;
for each polygon do
    for each pixel in the polygon's projection do
    {
        pz:= polygon's z-coordinate at pixel coordinates (x,y);
        if pz >= Z-buffer [x,y] then
        {
            Z-buffer [x,y]:=pz;
            Frame-Buffer [x,y]:=pixel data at x,y;
        }
    }
};
```

Prior to executing the above process, the Z-buffer and Frame-buffer data are initialized to be blank. Then, polygons are projected onto the plane of view P and pixel data are determined therefor for storage in the Z-buffer. The process illustratively is executed in the course of identifying each pixel that corresponds to a portion of the projection of a currently processed polygon onto the plane of view. That is, for each polygon (selected in, for example, an arbitrary order), each pixel at coordinates x,y representing a projected portion of the polygon is examined. Suppose the portion of the polygon that projects onto the pixel x,y has a Z-coordinate that is greater than or equal to the current Z-coordinate currently stored in the Z-buffer for that pixel. If this occurs, then this currently selected portion of the polygon is nearer to the plane of view P than any other portion of any other polygon previously mapped onto this pixel. In such a case, the pixel data of the polygon, e.g., its color, texture, shading, etc., are written into the Frame-buffer, thereby overwriting any previously stored information for any other (more distant and occluded) polygon portion previously mapped onto this pixel. Furthermore, the Z-coordinate of the polygon portion is assigned to the pixel at these coordinates x,y by overwriting the currently stored Z-coordinate in the Z-buffer for the pixel at coordinates x,y. See J. FOLEY, A. VAN DAM, S. FEINER & J. HUGHES, COMPUTER GRAPHICS: PRINCIPLES AND PRACTICE, p. 668–72 (1987). For the polygons T1 and T2 depicted in FIG. 5, the Z-buffer process results in the transformation depicted in FIG. 6.

Consider now the scan conversion process in greater detail. Two techniques may be utilized in estimating the projection of a polygon as a pixellated image. FIG. 7 shows a first technique. An actual projection of a triangle T3 is shown which is overlaid by the row-column (i.e., x-y) grid of the pixels in the plane of view. The actually projected vertices are labeled A3, B3 and C3. According to the first technique, each of the actually projected vertices is estimated as the pixel center A3', B3' nearest to the respective actual vertex projection A3, B3 or C3, respectively. The estimate vertices A3', B3' and C3' define an estimate triangle T3' having edges e1', e2' and e3'. Each edge e1', e2' and e3' has a respective slope m1', m2' or m3' indicating the number of columns of pixels per pixel row and can be determined as follows:

$$m1' = \frac{x_{B3'} - x_{A3'}}{y_{B3'} - y_{A3'}}, \quad m2' = \frac{x_{C3'} - x_{A3'}}{y_{C3'} - y_{A3'}}, \quad m3' = \frac{x_{C3'} - x_{B3'}}{y_{C3'} - y_{B3'}} \quad (1)$$

where $x_{A3'}$ is the x (column) coordinate of A3'

$y_{A3'}$ is the y (row) coordinate of A3'

$x_{B3'}$ is the x (column) coordinate of B3'

$y_{B3'}$ is the y (row) coordinate of B3'

$x_{C3'}$ is the x (column) coordinate of C3'

$y_{C3'}$ is the y (row) coordinate of C3'

The pixels are then selected as follows. Starting, for example, from the estimated vertex with the lowest row coordinate, i.e., A3', the pixel centered at this starting vertex A3' is selected. Then "edge walking" is performed on the two edges e1' and e2' connected to the starting vertex A3'. According to edge walking, the slope m1' of the left-most edge e1' is added to the x coordinate $x_{A3'}$ of the vertex A3' and the sum rounded. This locates the initial pixel I1 in the next (increasing) row $y_{A3'}+1$ adjacent to the row $y_{A3'}$ containing the starting vertex A3'. Likewise, the slope m2' of the right-most edge is added to the x coordinate $x_{A3'}$ of the vertex A3' and the sum rounded. This locates the ending pixel E1 in the next (increasing) row $y_{A3'}+1$ adjacent to the row $y_{A3'}$ containing the starting vertex A3'. After edge walking on the edges e1' and e2' to locate the initial and ending pixels of the next row, each pixel in the next row $y_{A3'}+1$ between I1 and E1 is selected, e.g., in the order of I1 to E1. This is referred to as "span expansion." Edge-walking and span-expansion are repeated as necessary, including switching to edge walking on e3' as the right-most edge upon reaching vertex B3', until the vertex C3' is reached. Note that according to the first scan conversion process, pixels, whose center points are both within and outside the actual projection of the polygon T3 are included in the estimated pixellated image of the polygon T3.

A second scan conversion process is illustrated in FIG. 8. Unlike the first scan conversion process, pixels are only included in the estimated pixellated image of the polygon T3 if the center point of the pixel lies within the polygon T3. According to this technique, no estimates are initially formed for the vertices A3, B3 or C3. Rather, edge walking is performed on the edges e1, e2 and e3 of the actual projection of the triangle T3. As above, the slopes of the edges m1, m2 and m3 are determined by:

$$m1 = \frac{x_{B3} - x_{A3}}{y_{B3} - y_{A3}}, \quad m2 = \frac{x_{C3} - x_{A3}}{y_{C3} - y_{A3}}, \quad m3 = \frac{x_{C3} - x_{B3}}{y_{C3} - y_{B3}} \quad (2)$$

where $x_{A3}$ is the x (column) coordinate of A3

$y_{A3}$ is the y (row) coordinate of A3

$x_{B3}$ is the x (column) coordinate of B3

$y_{B3}$ is the y (row) coordinate of B3

$X_{C3}$ is the x (column) coordinate of C3

$y_{C3}$ is the y (row) coordinate of C3

In addition, the x-axis intercepts b1, b2 and b3 are determined by substituting the appropriate slope m1, m2, and m3 and the x-y coordinates of a vertex on the corresponding edge e1, e2 or e3. For example:

$$b1 = x_{A3} - m1 \cdot y_{A3}, \quad b2 = x_{C3} - m2 \cdot y_{C3}, \quad b3 = x_{B3} - m3 \cdot y_{B3} \quad (3)$$

Starting with a starting vertex, e.g., the vertex A3 with the smallest row coordinate, edge walking is performed on the edges e1 and e2. In the edge walking technique of the second process, the precise point of intersection between each edge e1 and e2 and the closest increasing coordinate row to the row of the starting vertex, i.e., $\lceil y_{A3} \rceil$ (where "⌈⌉" denotes the ceiling or nearest integer that is greater than or equal to), is determined. The point of intersection of e1 and $\lceil y_{A3} \rceil$ identifies the initial point I1 of the row $\lceil y_{A3} \rceil$ and the point of intersection of e2 and $\lceil y_{A3} \rceil$ identifies the end point E1 of the row $\lceil y_{A3} \rceil$. For instance, I1 and E1 can be determined by:

$$I1 = m1 \cdot \lceil y_{A3} \rceil + b1, \quad E1 = m2 \cdot \lceil y_{A3} \rceil + b2 \quad (4)$$

Then, span expansion is performed wherein each pixel in row $\lceil y_{A3} \rceil$ is selected having an x (column) coordinate that falls inclusively in the range $\lceil I1 \rceil$ to $\lfloor E1 \rfloor$ (where ⌊⌋ denotes the "floor" or nearest integer that is less than or equal to). Edge walking is then repeated for the next increasing row $\lceil y_{A3} \rceil + 1$. Note that the initial point I2 and ending point E2 in subsequent rows can be determined for edges e1 and e2 by simply adding the slope to the initial or ending point in the preceding row, i.e., I2=I1+m1 and E2=E1+m2. However, the initial point I for edge walking on edge e3 to row $\lceil y_{B3} \rceil$ must be determined using x=my+b, i.e., I=m3·$\lceil y_{B3} \rceil$+b3.

The z-buffering technique described above can be incorporated into either scan conversion technique. Thus, as each pixel is selected for a currently selected polygon, the z-coordinate of the polygon portion for which it is currently selected may be compared to the z-coordinate previously stored for some other polygon portion (of the same or different object) currently assigned to the selected pixel. If the z-coordinate of the currently selected portion exceeds (i.e., indicates that this currently selected polygon portion is closer), the z-buffer and frame buffer are updated in regard to the selected pixel with the z-coordinate and data of the currently selected polygon portion. According to the first scan conversion method, the initial pixel centered at A3' is assigned the z-coordinate of A3. A change in z-coordinate DZH, as one moves in pixel increments from column to column, is determined. Likewise, a similar change in z-coordinate DZL, as one moves in pixel increments from row to row DZL is also determined. Note that DZH and DZL will be constant values (that, for example, can be determined from the formula z=DZH·x+b or z=DZL·y+b, similarly as in equations (1) and (2)) for planar polygons. Thus, the z-coordinate to be assigned to each selected pixel x,y can easily be determined by adding $(x-x_0) \cdot DZH + (y-y_0) \cdot DZL$ to a known z-coordinate of the pixel at $x_0, y_0$ (such as the initial pixel A3', a preceding pixel in that row, etc.) (Note that $(x-x_0)$ represents the offset in columns and $(y-y_0)$ represents the offset in rows of the pixel centered at point x,y from the pixel centered at point $x_0, y_0$. A similar process may be carried out according to the second scan conversion technique, except that the initial pixel in the very first row $\lceil y_{A3} \rceil$ may be assigned the z-coordinate of the nearest intersecting point, namely, I1.

The problem with the scan conversion techniques described above is that the determination of the z-coordinates for each pixel are crude estimates. As the pixels are selected, an estimated z-coordinate having a non-negligible z-error is assigned to each pixel. This can result in pixels being assigned to the wrong (i.e., more distant) polygon portion. In particular, the error in estimated z-coordinate tends to increase as the pixels are selected within a row and as the scan progresses to successive rows. This is illustrated in FIGS. 9-10. In FIG. 9, the projection of two adjacent polygons T4 and T5 are shown which have a common edge e4. Edges are commonly shared in polygonal representations/samplings of more complex surfaces. The projection of polygon T4 does not overlap the projection of polygon T5 in the plane of view. The first scan conversion process is used to estimate the polygons. Estimated polygon projections T4' and T5' produced by the first scan conversion process are depicted. In the scan conversion process, the pixels 51 and 52 will be draw two times; once for polygon T4 and once for polygon T5. Assume that the polygon T4 is estimated as a pixellated image in the frame buffer first followed by estimating the polygon T5. For some of the pixels 52, the estimated z-coordinate may have an error indicating that the pixels are closer to the plane of view than previously assigned for the polygon T4. As such, the first scan conversion process causes the image data, i.e., color, texture, shading, etc., for these pixels 52 to be overwritten in the frame buffer with the image data for the polygon T5. Furthermore, the z-coordinates for the pixels 52 are overwritten in the z buffer with the estimated z-coordinates determined in respect to the polygon T5.

This problem can be overcome by using the second scan conversion process as shown in FIG. 10. Since each pixel 51 and 52 is drawn only once, depending on whether the pixel is inside the polygon projection T4 or inside the polygon projection T5, no erroneous overwriting can occur.

However, the second scan conversion technique only overcomes the erroneous pixel writing problem in the case that the projections of the two polygons do not overlap. Consider for instance, the projections of polygons T6 and T7 shown in FIG. 11. Polygon projections T6 and T7 have a common edge e5. Note that pixels 53 are inside of both polygon projections T6 and T7 near the edge e5. If there is a large error in the estimate for the z-coordinates in respect to the polygon projection T6 or T7, or both, one or more of the pixels 53 can be erroneously assigned the pixel data for the polygon T7 and not the polygon T6.

It is an object of the present invention to overcome the disadvantages of the prior art.

SUMMARY OF THE INVENTION

This and other advantages are achieved according to the present invention. An illustrative environment of use of the invention is a system including a drawing processor, a frame buffer with z buffer and a display device, such as a display monitor. The drawing processor is capable of rendering objects in polygonal shape form, using a z buffering technique. The particular technique employed reduces errors in assigning z-coordinates to pixels in respect to each polygon portion that maps onto the pixel in the z buffering technique, which errors would otherwise cause jagged image edges or errors in mapping polygon portions to pixels. In particular, the z-coordinate error tends to arise from the initial inaccuracy of the z-coordinate assigned to the very first pixel onto which the polygon is mapped. By correcting just this initial error, the z-coordinate error problem is alleviated. In particular, note that the initial pixel is selected as being near some first point on an edge or vertex of a projection of the polygon. The first point may be a projection of a second point on the polygon edge, whereas the center point of the pixel may be a projection of a third point which is typically in the plane of, and inside, the polygon, but not on the edge of the polygon. The z-coordinate of the second point may be used as a basis for determining the z-coordinate to be assigned to the pixel, but is corrected so as to reflect the z-coordinate of the third point for which it more accurately serves as a projection.

According to one embodiment, a method is provided for drawing one or more surfaces. A first pixel in a first row is selected. The first pixel is near a first point at which a projection onto a plane of view of a first edge of a first surface intersects the first row of pixels in the plane of view. A first distance from the first point to a second point on the first surface is determined. The first point is a projection onto the plane of view of the second point. The first distance is then corrected by a first value representing a difference in distance between the first distance and a distance from the first pixel to a third point on the first surface. The first pixel overlies, e.g., and is centered at, a point onto which the third point projects in the plane of view. The corrected first distance is assigned to the first pixel as representing a distance from the first pixel to the first surface.

Illustratively, distances are assigned to a plurality of pixels representing projections of one or more surfaces onto the plane of view. However, the pixels are selectively displayed on the display device such that each pixel is selected for display as representing a particular one of the surfaces depending on a distance assigned to the pixel in respect to that surface. That is, each pixel is illustratively displayed with image data, i.e., color, texture, shading, etc., of the portion of the surface that maps onto the pixel but which is nearer to the plane of view than any other surface portion that maps, i.e., projects, onto that pixel.

By correcting the distance, e.g., z-coordinate, assigned to the initial pixel, the propagation and accumulation of errors in the distance is minimized or avoided. Thus, pixels are not mistakenly assigned distances indicating that their respective surface or polygon portions are nearer to the plane of view than other surface or polygon portions when they are in fact farther away. The net result is that pixels, especially common edge pixels of adjacent polygons and surfaces, are displayed with image data for the nearer polygon or surface portion rather than the farther polygon surface portion.

Illustratively, the distance from the pixel to the polygon need only be corrected for the initial pixel onto which a surface or polygon is mapped or projected. Alternatively, the initial pixel in each row of pixels is furthermore corrected.

DETAILED DESCRIPTION OF THE INVENTION

Figure 1:
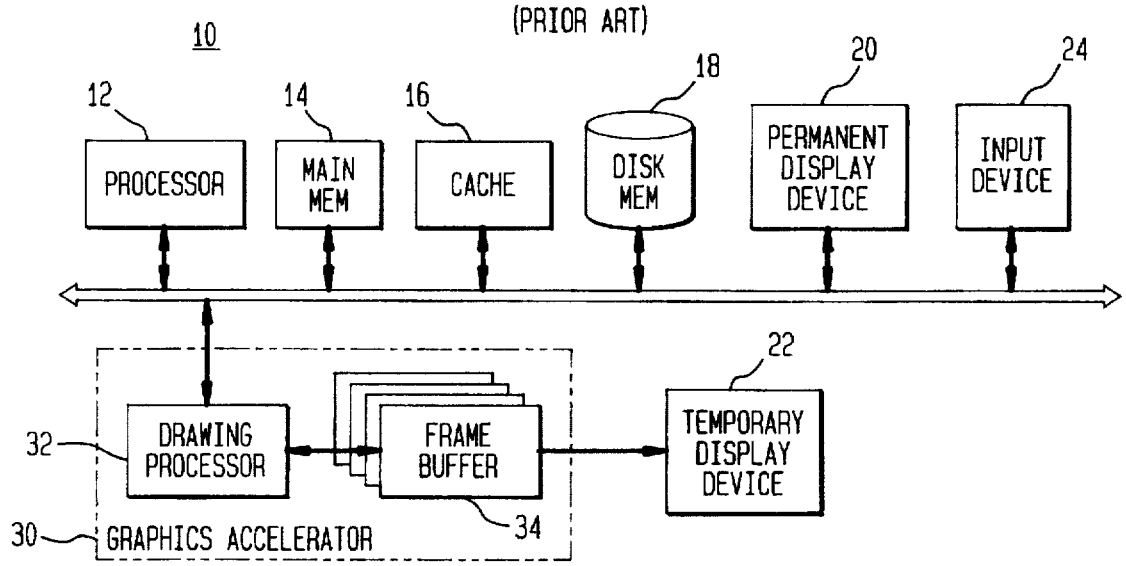
FIG. 1 shows a convention 3D graphics system.
Figure 2:
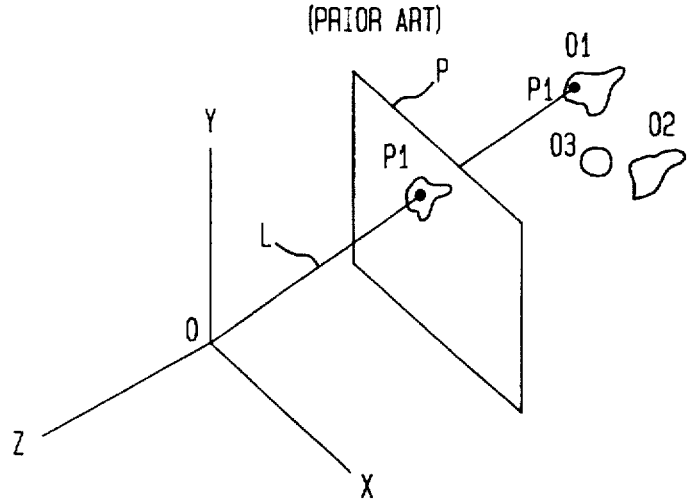
FIG. 2 shows a conventional projection process.
Figure 3:
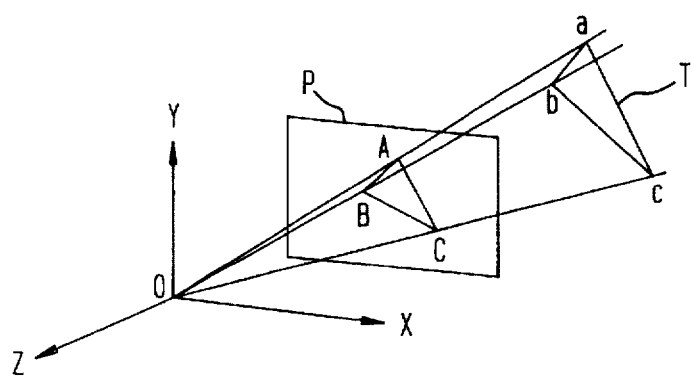
FIGS. 3 and 4 shows a scan conversion process in combination with a projection process.
Figure 4:
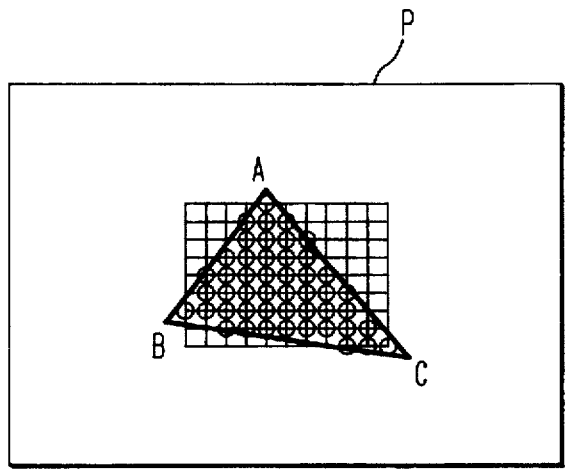
Figure 7:
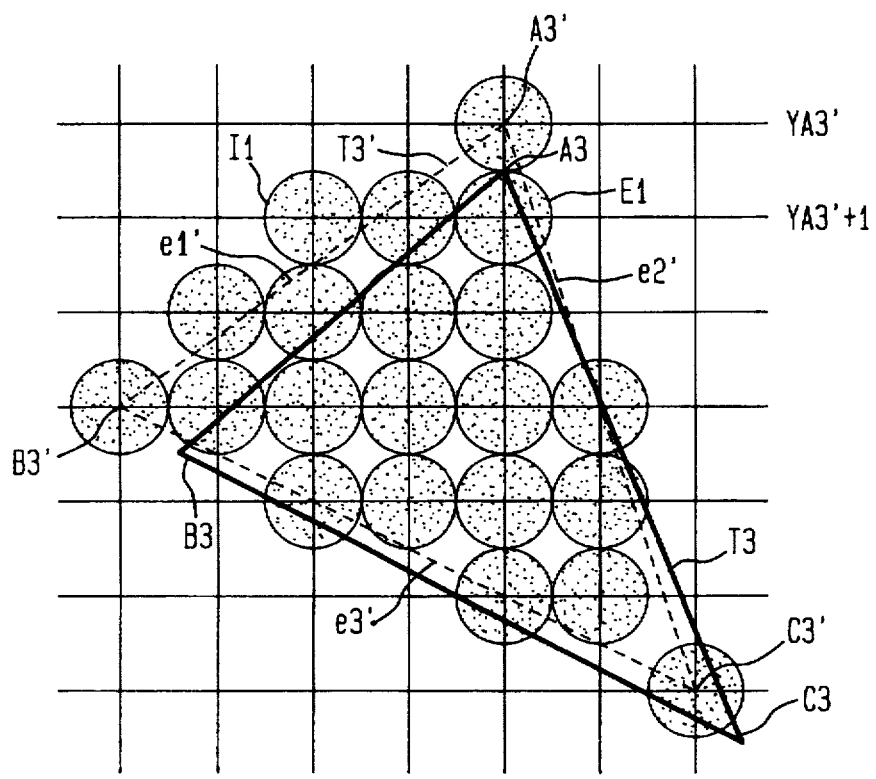
FIG. 7 shows a first scan conversion method.
Figures 5, 6:
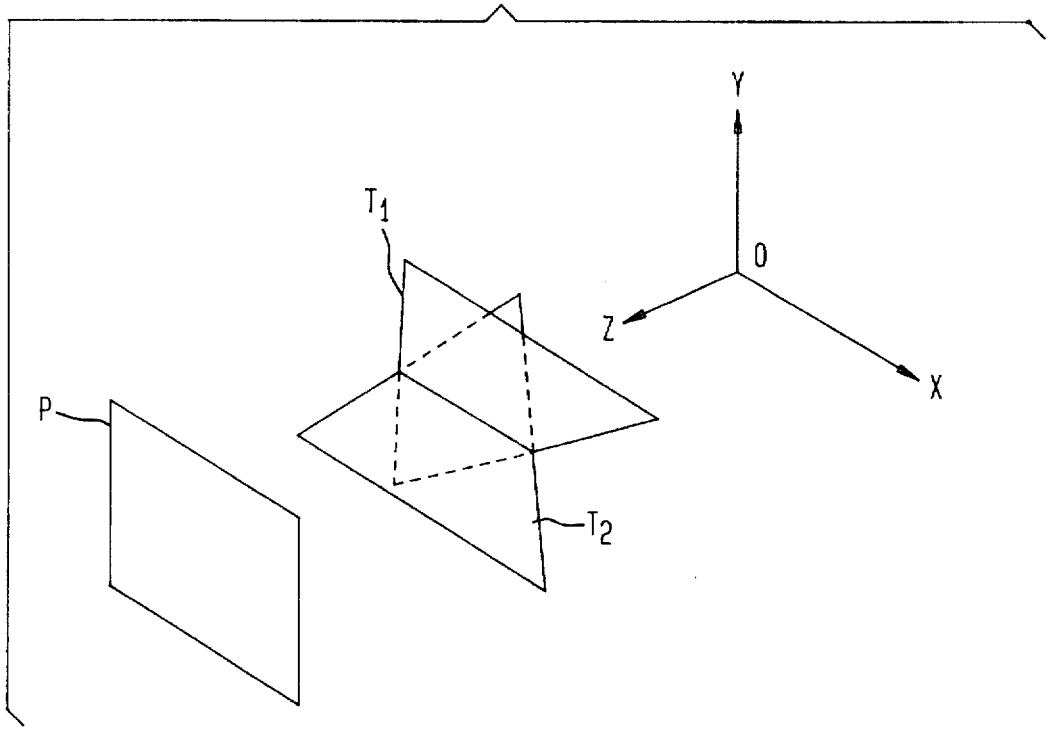
FIGS. 5 and 6 show a conventional z-buffering process.
Figure 8:
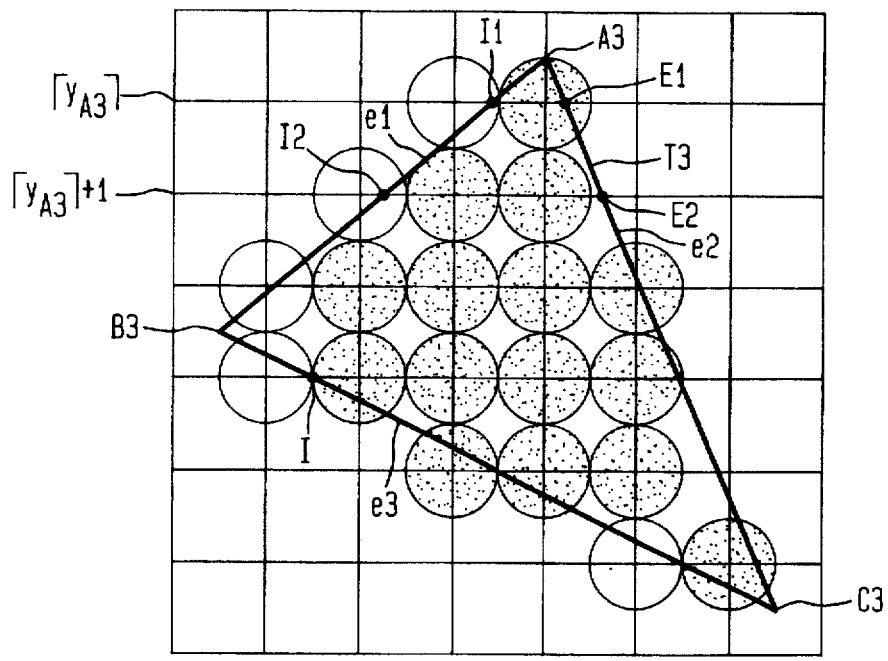
FIG. 8 shows a second scan conversion method.
Figure 9:
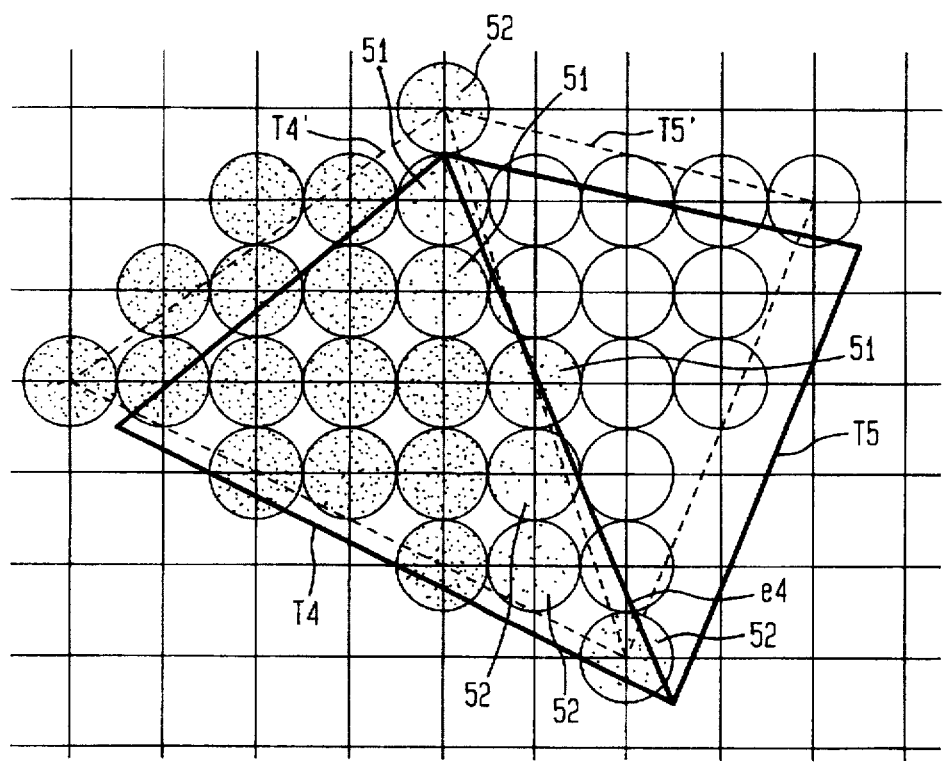
FIG. 9 shows a z-buffer error problem encountered for common edge polygons using the first scan conversion method of FIG. 7.
Figure 10:
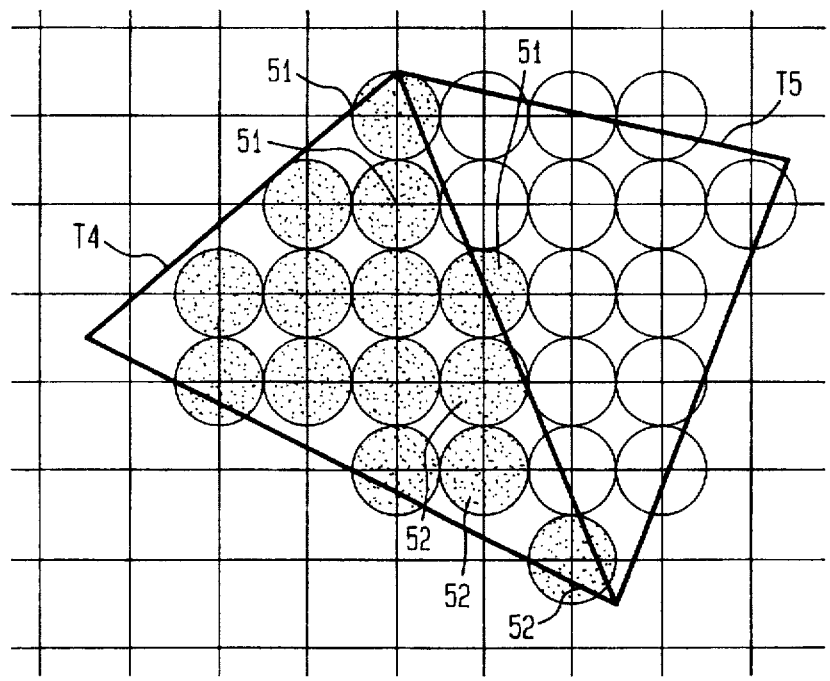
FIG. 10 shows the results of using the second scan conversion method of FIG. 8 on the common edge polygons of FIG. 9.
Figure 11:
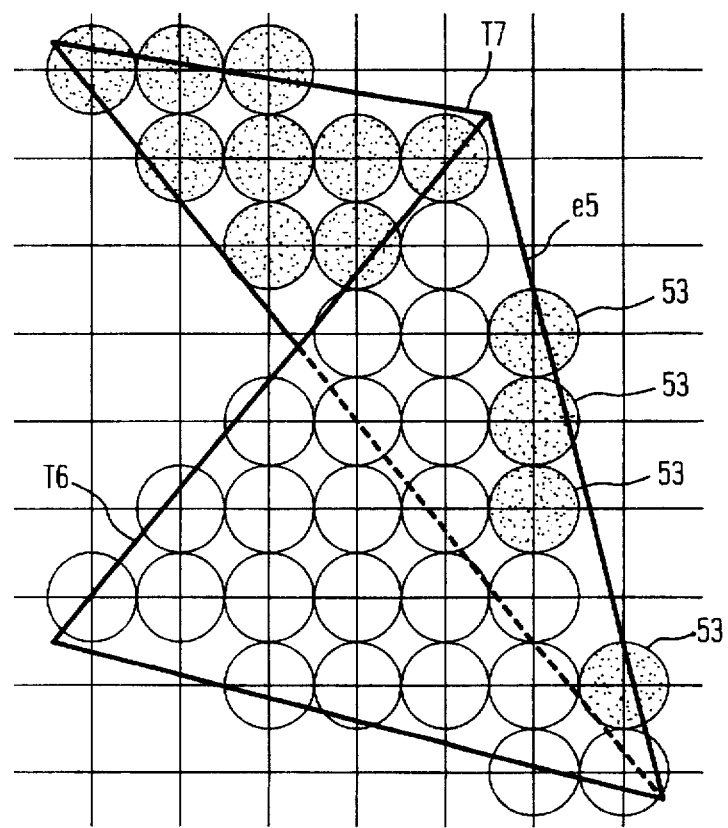
FIG. 11 shows a z-buffer error problem encountered for overlapping common edge polygons using the second scan conversion method.
Figure 12:
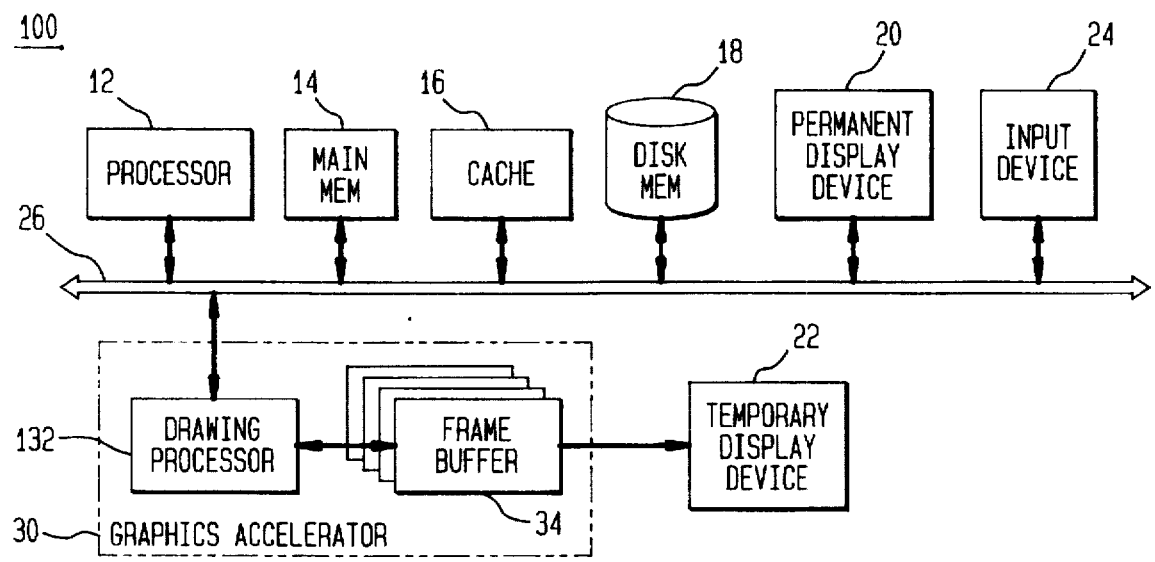
FIG. 12 shows a graphics system according to an embodiment of the present invention.

FIG. 12 shows a system 100 according to an embodiment of the present invention. The system 100 is similar to the system 10 of FIG. 1. However, in place of the drawing processor 32, a z-buffer error correcting drawing processor 132 is provided. As with the system 10, the user or application program executing in the processor 12 downloads to the drawing processor 132 information and/or program instructions regarding the size, shape, orientation, color, texture, lighting, etc. of one or more objects and view plane. The drawing processor 132 illustratively locates each object in 3D space and then draws a pixellated image of the objects as viewed in the plane of view in the frame buffer 34.

Figure 13:
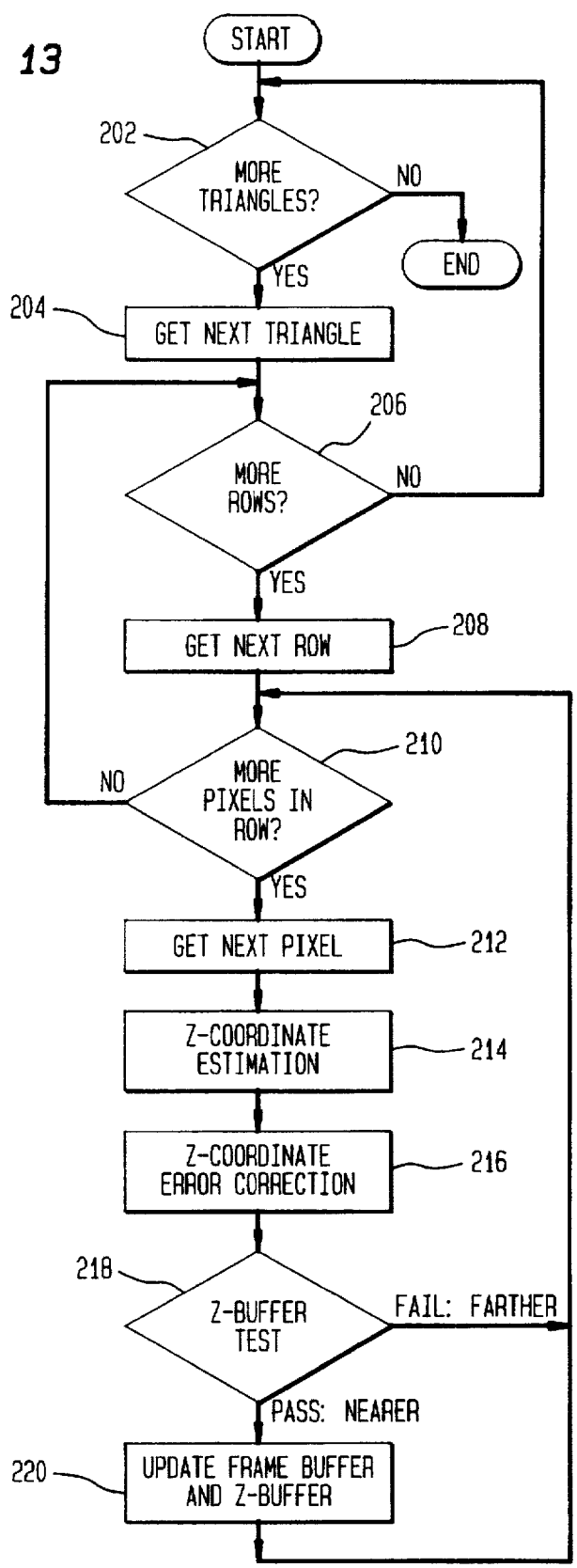
FIG. 13 shows a drawing process with z-coordinate error correction according to an embodiment of the present invention.

FIG. 13 illustrates an illustrative process executed by the drawing processor 132 in drawing the pixellated image. For sake of convenience, each object is presumed to be represented by one or more interconnected triangles. In a first step 202, the drawing processor 132 determines if there are more triangles to be mapped onto pixels. If not, the drawing processor 132 ends the rendering process. If there are more triangles to be mapped onto pixels, the drawing processor 132 executes step 204. In step 204, the drawing processor 132 gets the data of the next triangle to be drawn. The triangles may be selected in a particular order or an arbitrary order. Next, in step 206, the drawing processor 132 determines if there are more pixel rows to be mapped onto in the triangle selected in step 204. This effectively, is the edge walking process described above.

The drawing processor 132 then executes step 210, in which the drawing processor 132 determines if there are more pixels to be drawn in the currently selected row. This is the above described span expansion process in which each pixel including and between an initial row pixel and an end row pixel are selected. If no more pixels are to be selected (the end row pixel has been mapped onto), then the drawing processor returns to step 206 to edge walk to the next row. If there are more pixel to map onto in the current row, the drawing processor 132 executes step 212 in which the next pixel in the current row is selected for mapping.

Next in step 214, the z-coordinate of the pixel is estimated. As described above, this is typically done for the very first pixel of the triangle by assigning the z-coordinate of the point at which the projection of the row line containing the first pixel intersects the nearest edge. For many other pixel, the z-coordinate is estimated by assigning the z-coordinate of an adjacent pixel (i.e., a preceding pixel in that row or, for the initial pixel in a row other than the very first pixel, by a pixel in a previous row nearest thereto). In the same step 214, the estimate is adjusted by DZL (change in z-coordinate per pixel row) and DZH (change in z-coordinate per pixel column) for that triangle.

As noted above, the z-coordinate chosen using the crude method of step 214 tends to produce drawing errors. Therefore, according to the invention, the drawing processor 132 also executes a step 216 wherein the z-coordinate assigned to a pixel is corrected. As described in greater detail below, the z-coordinates of only a limited number of pixels are corrected, e.g., the very first pixel of the triangle and the initial pixel in each row of the plane of view. In particular, the very first pixel onto which the drawing processor maps the triangle is centered at a point in the plane of view onto which a point in the plane of the triangle projects. The error between the z-coordinate of this second point and the z-coordinate of the row-edge intersection point initially assigned to the very first point in step 214 is used to correct the z-coordinate assigned to the pixel.

After correcting the z-coordinate of the pixel, the drawing processor 132 executes step 218. In step 218, the drawing processor 132 performs the z-buffer test in which the drawing processor determines if the portion of the currently processed triangle to mapped onto the currently selected pixel is closer to the plane of view than any other portion of any other triangle previously mapped onto this pixel. As noted above, the z-coordinate of the triangle portion previously determined to be nearest to this pixel is advantageously stored in a z-buffer at coordinates corresponding to the currently selected pixel. Thus, if the z-coordinate assigned to the currently selected pixel indicates that this pixel is nearer to the plane of view than the z-coordinate currently stored in the z-buffer, the pixel passes the z-buffer test of step 218 and the drawing processor 132 executes step 220. On the other hand, if the drawing processor 132 determines that the z-coordinate determined for the currently selected pixel is farther from the plane of view than the z-coordinate currently stored in the z-buffer, the pixel fails the test and the drawing processor 132 returns to step 210.

Assume that the pixel passes the z-buffer test. In such a case, the drawing processor 132 executes step 220. In step 220, the drawing processor 132 stores the z-coordinate of the currently selected pixel (determined in steps 214 and 216) in the z-buffer thereby overwriting the z-coordinate stored therein. The drawing processor 132 also stores the pixel data for the triangle, i.e., its color, shading, texture, etc., in the frame buffer at a location corresponding to the currently selected pixel. The drawing processor 132 then returns to step 210.

The execution of steps 214–216 is now described in greater detail. The following is a description, in pseudo code format, of the processing performed by the processor:

```
if this pixel is the first pixel selected for this triangle then
{
    ERROR_Z=FPZ_ERROR;
    Z0=FPZ;
    Z=Z0+ERROR_Z;
}
else if this pixel is an initial pixel of a row then
{
    Z0=Z0+DZL;
    EZ=ERROR_Z+DZ_ERROR;
    if (EZ>DZH) then
        ERROR_Z=EZ-DZH;
    else
        ERROR_Z=EZ;
    Z=Z0+ERROR_Z;
}
else this pixel is a non-initial pixel in a row
    Z=Z+DZH;
```

Figure 14:
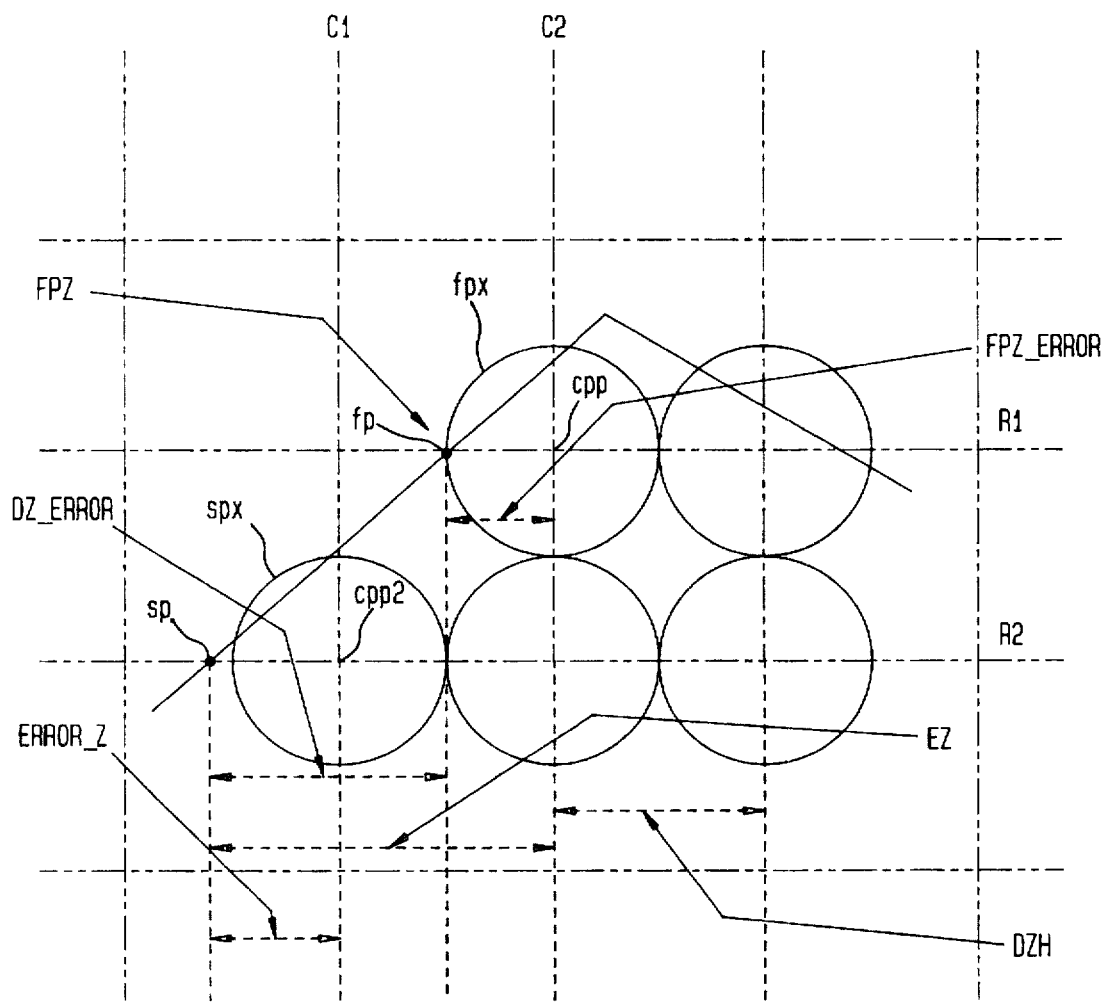
FIG. 14 illustrates the z-coordinate error correction in greater detail.

FIG 14 illustrates the relationship of the variables used in the process depicted above. These variables are as follows:

| | |
|---|---|
| ERROR_Z | is a temporary variable used to hold a cumulative difference in z-coordinate between the intersection of the triangle edge and a projection of the pixel rows and the projection of the center point of the initial pixel of the preceding row onto the plane of the triangle. Simply stated, this is the cumulative error in z-coordinate from the edge to the center point projection of the initial pixel in the previous |

-continued

| | row. |
|---|---|
| Z0 | is the z-coordinate of the intersection of an edge and a projection of a pixel row line. Z0 is initially assigned as the z-coordinate to the very first pixel fpx or initial pixel of a row spx in step 214. |
| FPZ | is the z-coordinate of a first point fp at the intersection of the first edge e1 of the triangle nearest the very first pixel fpx onto which the triangle is mapped and the projection of the row line R1 containing fpx onto the triangle. |
| FPZ_ERROR | represents the difference in the actual z-coordinate between FPZ and a second point cpp in the plane of the triangle wherein cpp projects onto the plane of view at the center point of the very first pixel fpx. FPZ_ERROR can be determined by "reverse-projecting" the center point of the very first pixel fpx onto cpp. This is done by determining the line equation for the projecting line (e.g., for a center point projection using the origin O and the center point of the pixel fpx in the plane of view). The line equation is the solved for the point at which the line equation intersects the plane containing the triangle, which intersection point is cpp. |
| DZL | is the change in z-coordinate from the center point of a pixel in one row to the center point of a pixel in the same column but an adjacent row. Since the triangle is planar, DZL is constant from row to row and column to column over the entire triangle. DZL can be determined by solving z=my+b for the slope m for a line that runs between, for example, the intersection of a column and two edges of the triangle. |
| DZH | is the change in z-coordinate from the center point of a pixel in one column to the center point of a pixel in the same row but an adjacent column. Again, since the triangle is planar DZH is constant from column to column and from row to row over the entire triangle. DZH can be determined by solving z=mx+b for the slope m for a line that runs, for example, between the intersection of a row and two edges of the triangle. |
| DZ_ERROR | represents the part of the difference in z-coordinate between the point at which the row containing the very first point intersects the edge of the triangle (at point fp) and the point sp at which the very next row intersects the edge of the triangle attributable to the column change from fp to sp. In short, DZ_ERROR is the change in z-coordinate as one edge walks along a particular edge from one pixel row to the next attributable to the change in horizontal component during edge walking. DZ_ERROR can be easily determined by solving z=mx+b on the edge e1 for m. |

The error correction steps of the process shown above are now explained. When the very first pixel fpx is selected in a triangle, it is assigned the z-coordinate FPZ of the point fp at which the projection of the row containing the very first pixel fpx, i.e., row RI, intersects the edge e1. This is conventional as per step 214. As noted, the error in this initial z-coordinate assignment, though slight, can have a dramatic impact on drawing all pixels in the triangle. Therefore, according to the invention, the z-coordinate is further corrected to more accurately reflect the true z-coordinate of the pixel. In particular, the z-coordinate is corrected to equal the z-coordinate of the point cpp that projects onto the center point of the very first pixel fpx. This can be done by locating cpp in the triangle using a "reverse projection" technique (i.e., determining where a projecting line through the center of fpx intersects the plane containing the triangle) and then subtracting the two z-coordinates to determine FPZ_ERROR.

Consider now the assignment of z-coordinates to the initial pixel in each subsequent row, for example, the pixel spx of row R2. The pixel spx has a center point onto which a point cpp2 in the plane of the triangle projects. It is desirable to assign the z-coordinate of the point cpp2 to the pixel spx. It is possible to do this in a similar manner as was done for the very first pixel fpx. Advantageously, however, processing can be conserved if certain constants are simply added to the z-coordinate of the very first pixel fpx. For instance, because the triangle is planar, the change in z-coordinate from pixel row to pixel row is constant and can be determined by solving z=my+b for the slope m. This slope is assigned to DZL. Likewise, the change in z-coordinate from pixel column to pixel column is constant and can be determined by solving z=mx+b on the triangle for the slope m. This slope is assigned DZH. In addition, the change in z-coordinate as one edge walks from row to row, e.g., from row R1 to R2 can be determined. This change in z-coordinate has a vertical component attributable to the change in rows which equals DZL. The change also has a horizontal component attributable to the horizontal change which typically is different from DZH. The horizontal component is assigned to DZ_ERROR. Note that from a geometrical inspection of FIG. 14, the z-coordinate at cpp2 equals the z-coordinate at cpp+DZL (row-to-row change in z-coordinate)+DZ_ERROR. It should be noted that cpp is equal to the z-coordinate at fp plus an error ERROR_Z FPZ_ERROR. Thus, the z-coordinate at cpp2 equals the z-coordinate at the previous row-edge intersection point fp+ERROR_Z+DZ_ERROR+DZL. Note also that e1 crosses the column line C1 in edge walking from row R1 to row R2. However, ERROR_Z is a cumulative left-to-right error from the edge e1 to the column C2 at which the initial pixel of the previous row fpx is located. The initial row pixel spx should have its z-coordinate determined relative to the column line C1, not C2. Therefore, if a column line is crossed, instead of adding ERROR_Z, the difference equal to DZH-ERROR_Z is used to determine the change in z-coordinate EZ from fpx to spx. Furthermore, ERROR_Z is recalculated as EZ less the number of integral multiples of DZH contained in EZ (for sake of convenience, it is presumed that only a single multiple of DZH can be contained in EZ). In the above algorithm, the drawing processor 132 determines that a column line is crossed in edge-walking from one row to the next if the sum of EZ_ERROR and DZ_ERROR exceeds DZH.

In the case of any pixel in a row which is not the very first pixel or an initial pixel in a row, the z-coordinate can very simply be determined by adding DZH to the immediately preceding pixel in that row.

Figure 15:
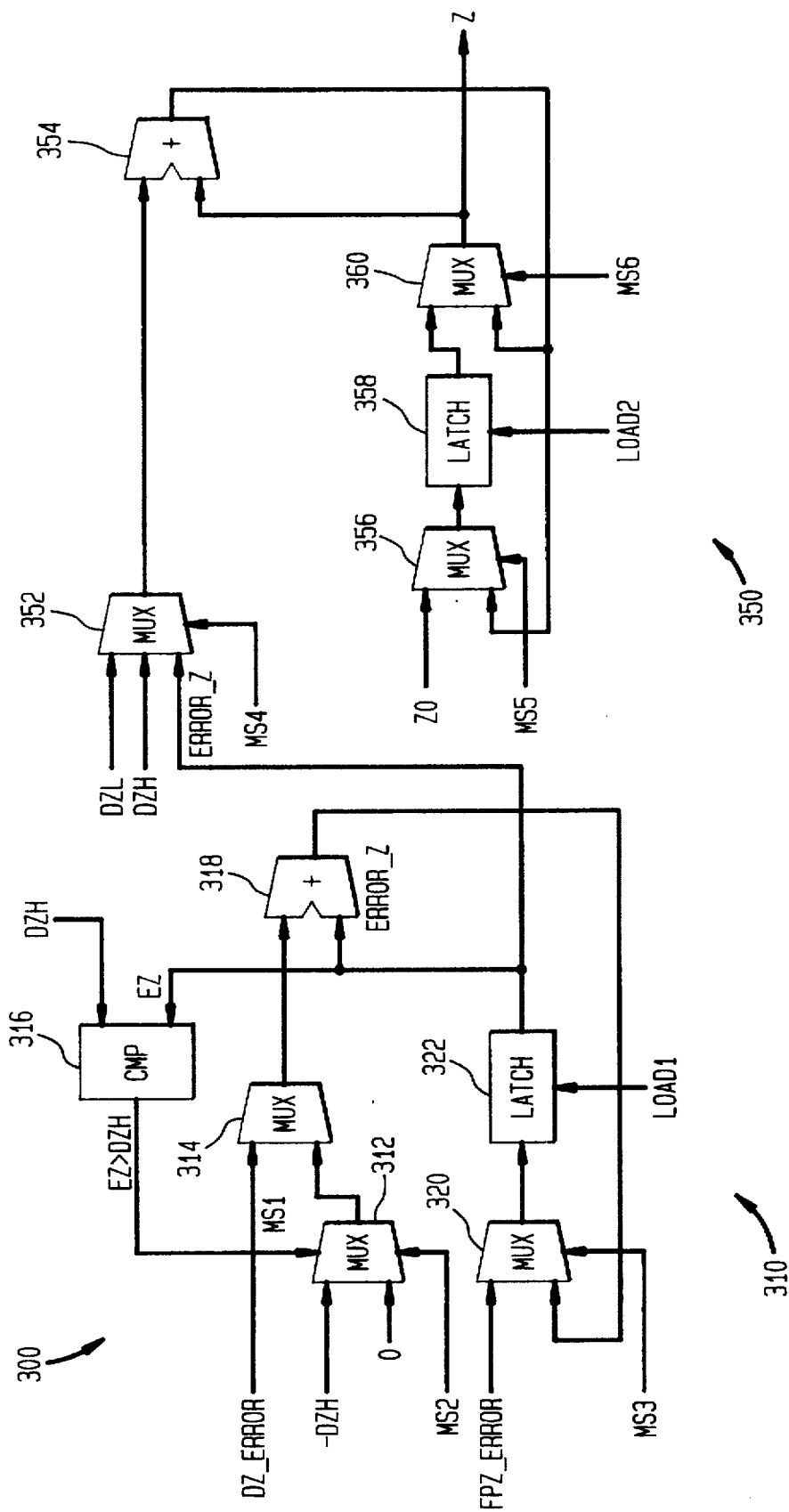
FIG. 15 shows a circuit according to another embodiment of the present invention.

FIG. 15 shows a circuit 300 which can be incorporated into the drawing processor 132. The circuit 300 illustratively includes a z-coordinate error correction circuit 310 and an error corrected z-coordinate generator circuit 350. The z-coordinate error correction circuit 310 includes a multiplexer 312 which receives −DZH and 0, from, for example, the drawing processor 132, as selectable inputs. The output of the multiplexer 312 is fed as one input to another multiplexer 314. This multiplexer 314 also receives as a selectable input DZ_ERROR from, for example, the drawing processor 132. The drawing processor 132 illustratively also supplies a select signal MS2 for selecting one of the two inputs of the multiplexer 314 for output. The output of the multiplexer 314 is fed as one input to an adder 318.

Illustratively, the drawing processor 132 supplies the signal FPZ_ERROR as one selectable input and a select control input MS3 to a multiplexer 320. The output of the multiplexer 320 is fed to a data input of a latch 322. The latch 322 also receives a load/clock signal LOAD1 from, for example, the drawing processor 132. In response, the latch circuit 322 selectively stores the signal outputted from the multiplexer 320 therein. The output of the latch 322 is fed as a second input to the adder 318. The adder 318 adds the signals at its inputs and produces the sum thereof at its output. This sum is fed back as a selectable input to the multiplexer 320.

The output of the latch is also fed to a comparator circuit 316. The comparator 316 also receives the signal DZH from, for example, the drawing processor 132. If the signal outputted from the latch 320 exceeds the value DZH, then one signal, e.g., a logic '0' bit is outputted as the select control signal MS1 to the multiplexer 312. Otherwise a different signal, e.g., a logic '1' bit is outputted as MS1.

The error corrected z-coordinate generator circuit 350 includes a multiplexer 352 which receives as selectable inputs, the ERROR_Z signal outputted from the latch 322, and the signals DZH and DZL from, for example, the drawing processor 132. The drawing processor 132 illustratively also supplies the selector control signal MS4 to the multiplexer 352. The signal selected for output from the multiplexer 352 is fed as one input to an adder 354.

The error corrected z-coordinate generator circuit 350 has another multiplexer 356 which receives the selector control signal MS5, and the signal Z0 as a selectable input from, for example, the drawing processor 132. The signal selected by the multiplexer 356 is outputted to a data input of a latch 358. The latch 358 also receives a load/clock signal LOAD2 from, for example, the drawing processor 132. The latch 358 outputs the signal stored therein as a selectable input to a multiplexer 360 which also receives a selection control signal MS6 from, for example, the drawing processor 132.

The output of the multiplexer 360 is fed as an input to the adder 354. The adder 354 adds the signals provided at its inputs and outputs the sum of the two signals as a selectable input to both the multiplexers 356 and 360. The output of the multiplexer 360 also serves as the error corrected z-coordinate Z of the pixel. The signal Z is illustratively received at the drawing processor 132 for further processing, i.e., Z-buffer testing, etc.

The operation of the circuitry 300 is now described. Consider first the determination of the z-coordinate for the very first pixel fpx. The drawing processor 132, using other circuitry not shown, determines the x,y coordinates of fpx, the location of cpp and fp, FPZ, DZH, DZL, DZ_ERROR and FPZ_ERROR. On a first cycle, the drawing processor 132 outputs FPZ_ERROR to multiplexer 320, a signal MS3 for selecting FPZ_ERROR at multiplexer 320 and signal LOAD1 for storing FPZ_ERROR in latch 322 as ERROR_Z. Simultaneously, the drawing coprocessor 132 outputs FPZ to multiplexer 356, a signal MS5 for selecting FPZ at multiplexer 356 and a signal LOAD2 for causing latch 358 to store FPZ as the initial z-coordinate Z0.

On cycle two, ERROR_Z is outputted to multiplexer 352. The drawing processor 132 outputs a signal MS4 for selecting ERROR_Z for output to the adder 354. Simultaneously, the drawing processor 132 outputs a signal MS6 for causing multiplexer 360 to select the signal stored in the latch 358, namely, Z0=FPZ. The adder 354 adds together Z0 and ERROR_Z to produce Z=Z0+ERROR_Z=FPZ+FPZ_ERROR.

Now consider the processing of pixels in the same row as fpx during span expansion. Initially, Z is stored in latch 358. For instance, during the same cycle two noted above, the drawing processor 132 can output a signal MS5 for causing the multiplexer 356 to output the signal Z received from the adder 354. The drawing processor 132 can also output a signal LOAD2 for storing Z in the latch 358. Thus, on cycle three, the drawing processor 132 can output signal DZH and a signal MS4 for causing multiplexer 352 to output DZH to the adder 354. Simultaneously, the drawing processor 132 outputs a signal MS6 for causing multiplexer 360 to output the signal Z stored therein to the adder 354. The adder outputs the sum Z=Z+DZH. This sum signal is received at the drawing processor 132 for further processing. In addition, the drawing processor 132 outputs a signal MS5 for causing the multiplexer 356 to select the output of the adder Z=Z+DZH. In addition, the drawing processor 132 outputs a signal LOAD2 that causes the latch 358 to store the updated signal Z therein.

Consider now the case of processing an initial pixel spx of a row as a result of edge walking. Initially, the signal ERROR_Z is stored in the latch 322 such as in the situation after cycle one discussed above. Assume, however, that processing as discussed hereunder begins at some cycle n later than cycle one. At cycle n, the drawing processor 132 outputs the signals DZ_ERROR and MS2 to the multiplexer 314 which cause the multiplexer 314 to output the signal DZ_ERROR to the adder 318. The latch 322 outputs the signal stored therein to the adder 318. This causes the adder 318 to produce the sum EZ=DZ_ERROR+ERROR_Z. The drawing processor 132 outputs a signal MS3 for causing the multiplexer 320 to store the sum EZ in the latch 322.

Meanwhile, on the same cycle n, the drawing processor 132 outputs the signal Z0 as the initial z-coordinate. Z0 is the z-coordinate of the point at the intersection of the edge and the projection of the previous row line. For instance, in the case of spx, Z0 is the z-coordinate of fp, namely, FPZ.

On the next cycle n+1, the drawing processor 132 supplies signals 0 and −DZH to the multiplexer 312 and the value DZH to the comparator 316. The latch 322 outputs the signal EZ stored therein to the comparator 316. The comparator compares its two inputs, namely, DZH and EZ. If EZ>DZH, the comparator 316 outputs a signal MS 1 to the multiplexer 312 for selecting −DZH for output. Otherwise, the comparator 315 outputs a signal MS1 for selecting the signal 0 for output. The signal 0 or −DZH selected by the multiplexer 312 is added with EZ in the adder 318. The result ERROR_Z thus produced is inputted through the multiplexer 320 to the latch for storage as ERROR_Z (the drawing processor 132 supplies appropriate signals MS2 and LOAD1 to that end).

Meanwhile, on the same cycle n+1, the drawing processor 132 outputs the signal DZL, and a signal MS4 for selecting DZL, to the multiplexer 352. The drawing processor 132 also outputs a signal MS6 for selecting the signal Z0 stored in the latch 358 for output. These two selected signals, namely, Z0 and DZL, are fed to the adder 354 which produces their sum. The drawing processor 132 furthermore outputs signals MS5 and LOAD2 for selecting this sum Z0+DZL for output from the multiplexer 356 and storage in the latch 358.

On cycle n+2, the signal ERROR_Z is outputted from the latch 322 to the multiplexer 352. The drawing processor 132 outputs a signal MS4 for selecting ERROR_Z. The drawing processor also outputs the signal MS6 to the multiplexer 360 for selecting the signal Z0+DZL stored in the latch 358. These two selected signals are added together in the adder 354 to produce the error corrected z-coordinate Z=Z0+DZL+ERROR_Z. The drawing processor 132 outputs appropriate signals MS5 and LOAD2 signals for selecting the signal Z at the multiplexer 356 and storing it in the latch 358. On the next cycle n+3, the drawing processor outputs a signal MS6 to the multiplexer 360 which causes it to select the error-corrected z-coordinate Z stored in the latch 358 for output. This Z coordinate value may be output to other circuitry in the drawing processor 132 for further processing.

In each of the z-coordinate determination processes described above, the steps may be overlapped where ever possible (i.e., no signalling conflict) to improve processing efficiency.

In summary, a method and apparatus for drawing pixellated images on a display device are disclosed. A first pixel in a first row is selected. The first pixel is near a first point at which a projection onto a plane of view of a first edge of a first surface intersects the first row of pixels in the plane of view. A first distance from the first point to a second point on the first surface is determined. The first point is a projection onto the plane of view of the second point. The first distance is then corrected by a first value representing a difference in distance between the first distance and a distance from the first pixel to a third point on the first surface. The first pixel overlies, e.g., and is centered at, a point that is a projection onto the plane of view of the third point. The corrected first distance is assigned to the first pixel as representing a distance from the first pixel to the first surface. All of these steps can be performed by a processor such as a general purpose processor, a drawing processor or an enhanced drawing processor with specialized circuitry as shown in FIG. 15.

Finally, the above-discussion is intended to be merely illustrative of the invention. Numerous alternative embodiments may be devised by those having ordinary skill in the art without departing from the spirit and scope of the following claims.

The claimed invention is:

1. In a display system that displays pixellated images of projections of one or more surfaces onto a plane of view, a method for drawing one or more surfaces comprising the steps of:

(a) selecting a first pixel in a first row, which first pixel is near a first point at which a projection onto said plane of view of a first edge of a first one of said surfaces intersects said first row, (b) determining a first distance from said first point to a second point on said first surface, wherein said first point is a projection onto said plane of view of said second point, (c) correcting said first distance by a first value representing a difference in distance between said first distance and a distance from said first pixel to a third point on said first surface, wherein said first pixel overlies a point that is a projection onto said plane of view of said third point, and (d) assigning said corrected first distance to said first pixel as representing a distance from said first pixel to said first surface.

2. The method of claim 1 further comprising the steps of:

(e) assigning distances to a plurality of pixels representing projections of one or more of said surfaces onto said plane of view, and (f) selectively displaying said pixels on a display device, where each pixel is selected for display as representing a particular one of said surfaces depending on a distance assigned thereto.

3. The method of claim 2, wherein projections of a plurality of said surfaces overlap at at least one pixel, each of said overlapping surfaces being associated with a distance from said at least one pixel to a projection of said at least one pixel onto said surface, said step (f) further comprising the step of:

(f1) displaying said pixel as representing a nearest one of said surfaces to said pixel.

4. The method of claim 3 further comprising the steps of:

(g) selecting each pixel in said first row, from said first pixel to a second pixel that is near a fourth point at which a projection onto said plane of view of a second edge of said first surface intersects said first row, (h) determining the distance of each of said pixels selected in said step (g), and of said second pixel, as the distance assigned to an immediately preceding pixel in said first row as adjusted by a second value representing a column-to-column change in distance to said first surface, and (i) assigning to each pixel in said first row said distance determined therefor in said step (g).

5. The method of claim 4 wherein said second value equals a per pixel column change of distance of a line that intersects said first and fourth points.

6. The method of claim 5 further comprising, for each row of a sequence of at least one row adjacent to said first row, the steps of:

(j) selecting an initial row pixel in said row near a corresponding initial projection point at which a projection onto said plane of view of an edge of said first surface intersects said row, (k) determining an initial distance from said initial row pixel to an initial row point as said first distance, wherein said initial row pixel overlies an initial row pixel point that is a projection of said initial row point onto said plane of view, (l) correcting said initial distance depending on at least said first value and a third value representing a change in distance to said surface per change in row, and (m) assigning said initial distance to said initial row pixel.

7. The method of claim 6 wherein said step (l) further comprises:

(l1) correcting said distance depending on a fourth value, wherein said fourth value represents a component of a change between said first distance and a distance from said initial projection point and a point that projects onto said initial projection point.

8. The method of claim 7 further comprising, for each row of said sequence of rows, the steps of:

(n) selecting each pixel in said row, from said initial row pixel to an end row pixel that is near an end projection point at which a projection onto said plane of view of an edge of said first surface intersects said row,

17

(o) determining the distance of each of said pixels selected in said step (n), and of said end row pixel, as the distance assigned to an immediately preceding pixel in said row as adjusted by said second value, and (p) assigning to each pixel in said row said distance determined therefor in said step (o).

9. The method of claim 1 wherein said step (d) comprises the step of:

(d1) assigning said corrected first distance to said first pixel, and image data of a corresponding portion of said first surface for which said first pixel represents a projection only if said first distance is less than each other distance assigned to said first pixel.

10. The method of claim 1 wherein said first pixel is near said first point if a center of said first pixel is contained within a projection of said surface onto said image plane and if a distance from said center of said first pixel to said first point is less than a distance from a center of each other pixel contained within a projection of said surface onto said plane of view.

11. A display system that displays pixellated images of projections of one or more surfaces onto a plane of view, comprising:

a processor for selecting a first pixel in a first row, which first pixel is near a first point at which a projection onto said plane of view of a first edge of a first one of said surfaces intersects said first row, determining a first distance from said first point to a second point on said first surface, wherein said first point is a projection onto said plane of view of said second point, correcting said first distance by a first value representing a difference in distance between said first distance and a distance from said first pixel to a third point on said first surface, wherein said first pixel overlies a point that is a projection onto said plane of view of said third point, and assigning said corrected first distance to said first pixel as representing a distance from said first pixel to said first surface.

12. The system of claim 11 wherein said processor is also for assigning distances to a plurality of pixels representing projections of one or more of said surfaces onto said plane of view, said system further comprising:

a display device for selectively displaying said pixels on said display device, where each pixel is selected for display as representing a particular one of said surfaces depending on a distance assigned thereto.

13. The system of claim 12, wherein projections of a plurality of said surfaces overlap at at least one pixel, each of said overlapping surfaces being associated with a distance from said at least one pixel to a projection of said at least one pixel onto said surface, wherein said display device is also for displaying said pixel as representing a nearest one of said surfaces to said pixel.

14. The system of claim 13 wherein said processor is also for selecting each pixel in said first row, from said first pixel to a second pixel that is near a fourth point at which a projection onto said plane of view of a second edge of said first surface intersects said first row, determining the distance of each of said selected pixels, and of said second pixel, as the distance assigned to an immediately preceding pixel in said first row as adjusted by a second value representing a column-to-column change in distance to said first surface, and assigning to each pixel in said first row said distance determined by said processor.

15. The system of claim 14 wherein said second value equals a per pixel column change of distance of a line that intersects said first and fourth points.

18

16. The system of claim 15 wherein said processor is also for, for each row of a sequence of at least one row adjacent to said first row, selecting an initial row pixel in said row near a corresponding initial projection point at which a projection onto said plane of view of an edge of said first surface intersects said row, determining an initial distance from said initial row pixel to an initial row point as said first distance, wherein said initial row pixel overlies an initial row pixel point that is a projection of said initial row point onto said plane of view, correcting said initial distance depending on at least said first value and a third value representing a change in distance to said surface per change in row, and assigning said initial distance to said initial row pixel.

17. The system of claim 16 wherein said processor is also for correcting said distance depending on a fourth value, wherein said fourth value represents a component of a change between said first distance and a distance from said initial projection point and a point that projects onto said initial projection point.

18. The system of claim 17 wherein said processor is also for, for each row of said sequence of rows, selecting each pixel in said row, from said initial row pixel to an end row pixel that is near an end projection point at which a projection onto said plane of view of an edge of said first surface intersects said row, determining the distance of each of said selected pixels, and of said end row pixel, as the distance assigned to an immediately preceding pixel in said row as adjusted by said second value, and assigning to each pixel in said row said distance determined therefor by said processor.

19. The system of claim 11 wherein said processor is also for assigning said corrected first distance to said first pixel, and image data of a corresponding portion of said first surface for which said first pixel represents a projection only if said first distance is less than each other distance assigned to said first pixel.

20. The system of claim 11 wherein said first pixel is near said first point if a center of said first pixel is contained within a projection of said surface onto said image plane and if a distance from said center of said first pixel to said first point is less than a distance from a center of each other pixel contained within a projection of said surface onto said plane of view.

21. A system comprising:

a bus, a first processor connected to said bus, a memory connected to said bus, a graphics accelerator connected to said bus that displays pixellated images of projections of one or more surfaces onto a plane of view, comprising:

a second processor for selecting a first pixel in a first row, which first pixel is near a first point at which a projection onto said plane of view of a first edge of a first one of said surfaces intersects said first row, determining a first distance from said first point to a second point on said first surface, wherein said first point is a projection onto said plane of view of said second point, correcting said first distance by a first value representing a difference in distance between said first distance and a distance from said first pixel to a third point on said first surface, wherein said first pixel overlies a point that is a projection onto said plane of view of said third point, and assigning said corrected first distance to said first pixel as representing a distance from said first pixel to said first surface.

* * * * *